United States Patent
Tremblay (10) Patent No.: US 8,294,730 B2
(45) Date of Patent: Oct. 23, 2012

(54) ANTI-ALIASING OF A GRAPHICAL OBJECT

(75) Inventor: Christopher Tremblay, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1022 days.

(21) Appl. No.: 11/899,033

(22) Filed: Sep. 4, 2007

(65) Prior Publication Data

US 2009/0058880 A1    Mar. 5, 2009

(51) Int. Cl.
*G09G 5/00* (2006.01)
*G09G 5/02* (2006.01)
*G06T 15/50* (2011.01)
*G06T 11/20* (2006.01)

(52) U.S. Cl. ........ 345/611; 345/426; 345/441; 345/442; 345/613; 345/614; 345/615

(58) Field of Classification Search .................. 345/426, 345/611, 613, 614, 615, 441, 442
See application file for complete search history.

(56) References Cited

U.S. PATENT DOCUMENTS

| | | | |
|---|---|---|---|
| 4,780,711 A * | 10/1988 | Doumas | 345/614 |
| 5,063,375 A * | 11/1991 | Lien et al. | 345/616 |
| 5,379,057 A | 1/1995 | Clough et al. | |
| 5,422,986 A * | 6/1995 | Neely | 345/426 |
| 5,675,362 A | 10/1997 | Clough et al. | |
| 5,999,189 A * | 12/1999 | Kajiya et al. | 382/232 |
| 6,181,822 B1 * | 1/2001 | Miller et al. | 382/232 |
| 6,339,479 B1 * | 1/2002 | Kishimoto | 358/1.2 |
| 6,429,877 B1 * | 8/2002 | Stroyan | 345/611 |
| 6,606,093 B1 * | 8/2003 | Gossett et al. | 345/441 |
| 6,882,326 B2 * | 4/2005 | Hirayama et al. | 345/1.1 |
| 6,922,199 B2 * | 7/2005 | Hunter | 345/611 |
| 6,933,951 B2 * | 8/2005 | Dawson | 345/611 |
| 6,982,723 B1 * | 1/2006 | Szymaniak | 345/611 |
| 6,987,511 B2 * | 1/2006 | Taubin | 345/420 |
| 7,019,737 B1 * | 3/2006 | Asai et al. | 345/211 |
| 7,046,230 B2 * | 5/2006 | Zadesky et al. | 345/156 |
| 7,050,067 B2 * | 5/2006 | Raubacher et al. | 345/611 |
| 7,283,138 B2 | 10/2007 | Tremblay | |
| 2002/0101435 A1 * | 8/2002 | Sasaki et al. | 345/611 |
| 2003/0197707 A1 * | 10/2003 | Dawson | 345/543 |
| 2003/0218694 A1 * | 11/2003 | Wang et al. | 348/565 |
| 2004/0041817 A1 * | 3/2004 | Hunter | 345/611 |
| 2004/0197028 A1 * | 10/2004 | Lin et al. | 382/279 |

(Continued)

OTHER PUBLICATIONS

Carpenter, L., "The A-buffer, an antialiased hidden surface method", SIGGRAPH Computer Graphics, vol. 18, Issue 3, Jul. 1984, pp. 103-108.*

(Continued)

*Primary Examiner* — Daniel F Hajnik
*Assistant Examiner* — Roberta D Prendergast
(74) *Attorney, Agent, or Firm* — Wong, Cabello, Lutsch, Rutherford & Brucculeri, L.L.P.

(57) ABSTRACT

A method for rendering graphical data is provided. In one embodiment, the method includes rendering an aliased version of one or more polygons and sampling one or more edges of the aliased polygons. The method also includes calculating a curve that approximates the edge portion and intersects a set of pixels, determining the proportional areas of the pixels located between the curve and the aliased edge portion, and rendering an anti-aliased version of the edge portion based on the proportional areas. Various devices, machine-readable media, and other methods for anti-aliasing of a graphical object are also provided.

22 Claims, 5 Drawing Sheets

U.S. PATENT DOCUMENTS

| | | | |
|---|---|---|---|
| 2005/0068333 A1* | 3/2005 | Nakahashi et al. | 345/611 |
| 2005/0248580 A1* | 11/2005 | Osako | 345/560 |
| 2006/0061594 A1* | 3/2006 | Collodi | 345/614 |
| 2006/0250414 A1* | 11/2006 | Golovin | 345/611 |
| 2006/0268013 A1* | 11/2006 | Miles | 345/635 |

OTHER PUBLICATIONS

Texas Instruments, "Video and Imaging Solutions Guide", copyright © 2004, pp. 1-44.*

J Dill, "The de Casteljau Algorithm for Evaluating Bezier Curves", from Rockwood, "Interactive Curves and Surfaces", Oct. 29, 2000, 3 pages, retrieved from: http://www.genie-meca.ac-aix-marseille.fr/Productique/PDF/361_deCasteljau_john.pdf.*

Tremblay, Christopher, U.S. Appl. No. 11/899,166, filed Sep. 4, 2007.

Tremblay, Christopher, U.S. Appl. No. 11/899,036, filed Sep. 4, 2007.

* cited by examiner

ANTI-ALIASING OF A GRAPHICAL OBJECT

BACKGROUND

1. Technical Field

The present invention relates generally to image processing and, more particularly, to the rendering of graphical objects for output to a display screen.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Electronic devices and systems increasingly include display screens as part of the user interface of the device or system. As may be appreciated, display screens may be employed in a wide array of devices and systems, including desktop computer systems, notebook computers, and hand-held computing devices, as well as various consumer products, such as cellular phones and portable media players. Such display screens may be useful for displaying status information about the device or for displaying information about an operation being performed by the device. For example, portable music and/or video players may display information about a music or video file being played by the device, such as the title of the song or video being played, the time remaining, the time elapsed, the artist or cast, or other information of interest. Alternatively, the display of such a device may display a piece of artwork or an arbitrary design during operation of the device.

In some instances, it may be desirable to show an image including one or more graphical objects on the display screen. Such graphical objects are generally composed of various lines, curves, and/or polygons, which are rendered by the device or system and then output to the display screen. Depending on the resolution, or the number of pixels, of the display screen, the rendered polygons of the graphical object may exhibit certain image artifacts, known as aliasing. In some contexts, such aliasing may be undesirable, reducing the aesthetic appearance of the rendered polygons and causing the rendered graphical object to appear less realistic and more artificial.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure relates to techniques for rendering graphical data. In accordance with one disclosed embodiment, an exemplary method may include the rendering of an aliased version of one or more elements (e.g., lines, curves, polygons, shapes, or the like) of a graphical object or, in other words, the conversion of a model of the one or more polygons of the graphical object into an aliased image. Following the rendering of the aliased polygons, in one embodiment, edges of the polygons may be sampled and approximated by a curve or function. The curve may then be compared to the aliased edges, and such comparison may be used to render an anti-aliased version of the polygons. For instance, in one embodiment, the area within a pixel between the aliased edge and the edge approximated by the curve may be used to determine a new color or shade in which the pixel is rendered in the anti-aliased version. In some embodiments, the new color or shade may be a blend of colors or shades taken from polygons on opposite sides of the aliased edge and mixed in proportion to the area of the pixel located between the approximate and aliased edges. Further, in one embodiment, the new color or shade for a given pixel may be a blend of colors or shades taken from other pixels adjacent to the given pixel. In this fashion, the edges of the polygons may appear to be smoothed, giving the rendered object a more realistic appearance.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present invention without limitation to the claimed subject matter.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
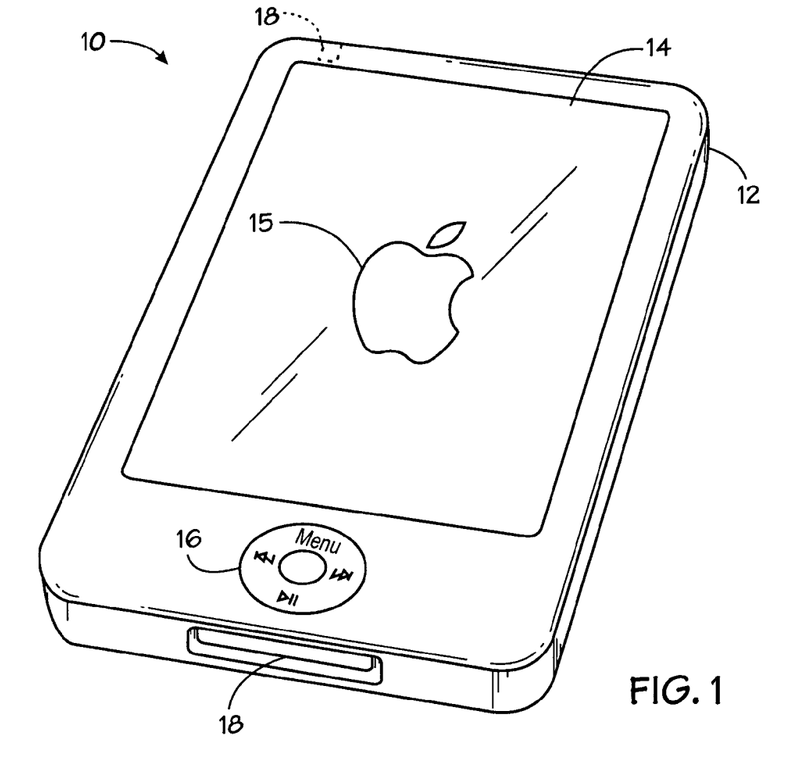
FIG. 1 is a perspective view illustrating a portable media player in accordance with one embodiment of the present invention.

An exemplary electronic device 10 is illustrated in FIG. 1 in accordance with one embodiment of the present invention. In some embodiments, including the presently illustrated embodiment, the device 10 may be a portable electronic device, such as a media player, a cellular phone, a personal data organizer, or the like. Indeed, in such embodiments, a portable electronic device may include a combination of the functionalities of such devices. In addition, the electronic device 10 may allow a user to connect to and communicate through the Internet or through other networks, such as local or wide area networks. For example, the portable electronic device 10 may allow a user to access the internet and to communicate using e-mail, text messaging, instant messaging, or using other forms of electronic communication. By way of example, the electronic device 10 may be a model of an iPod having a display screen or an iPhone available from Apple Inc.

In certain embodiments, the device 10 may be powered by one or more rechargeable and/or replaceable batteries. Such embodiments may be highly portable, allowing a user to carry the electronic device 10 while traveling, working, exercising, and so forth. In this manner, and depending on the functionalities provided by the electronic device 10, a user may listen to music, play games or video, record video or take pictures, place and receive telephone calls, communicate with others, control other devices (e.g., via remote control and/or Bluetooth functionality), and so forth while moving freely with the device 10. In addition, device 10 may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to render graphical data, such as a desktop computer.

In the presently illustrated embodiment, the exemplary device 10 includes an enclosure or housing 12, a display 14, user input structures 16, and input/output connectors 18. The enclosure 12 may be formed from plastic, metal, composite materials, or other suitable materials, or any combination thereof. The enclosure 12 may protect the interior components of the electronic device 10 from physical damage, and may also shield the interior components from electromagnetic interference (EMI).

The display 14 may be a liquid crystal display (LCD), a light emitting diode (LED) based display, an organic light emitting diode (OLED) based display, or some other suitable display. In accordance with certain embodiments of the present invention, the display 14 may display a user interface and various other images, such as logos, avatars, photos, album art, and the like. Additionally, in one embodiment, the display 14 may include a touch screen through which a user may interact with the user interface. The display may also include various function and/or system indicators to provide feedback to a user, such as power status, call status, memory status, or the like. These indicators may be incorporated into the user interface displayed on the display 14.

In one embodiment, one or more of the user input structures 16 are configured to control the device 10, such as by controlling a mode of operation, an output level, an output type, etc. For instance, the user input structures 16 may include a button to turn the device 10 on or off. Further the user input structures 16 may allow a user to interact with the user interface on the display 14. Embodiments of the portable electronic device 10 may include any number of user input structures 16, including buttons, switches, a control pad, a scroll wheel, or any other suitable input structures. The user input structures 16 may work with the user interface displayed on the device 10 to control functions of the device 10 and/or any interfaces or devices connected to or used by the device 10. For example, the user input structures 16 may allow a user to navigate a displayed user interface or to return such a displayed user interface to a default or home screen.

The exemplary device 10 may also include various input and output ports 18 to allow connection of additional devices. For example, a port 18 may be a headphone jack that provides for the connection of headphones. Additionally, a port 18 may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, and AC and/or DC power connectors. Further, the device 10 may use the input and output ports to connect to and send or receive data with any other device, such as other portable electronic devices, personal computers, printers, or the like. For example, in one embodiment, the device 10 may connect to a personal computer via an IEEE-1394 connection to send and receive data files, such as media files.

Figure 2:
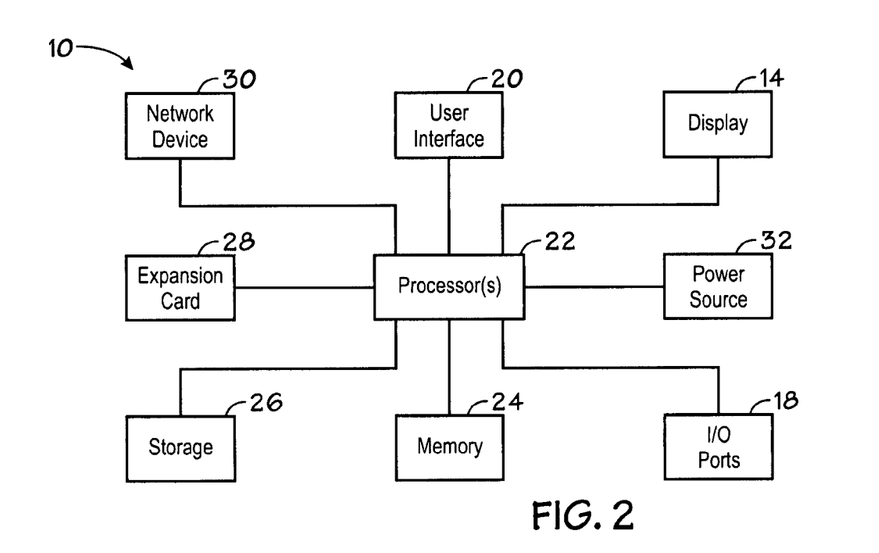
FIG. 2 is a simplified block diagram of the portable media player of FIG. 1 in accordance with one embodiment of the present invention.

Additional details of the illustrative device 10 may be better understood through reference to FIG. 2, which is a block diagram illustrating various components and features of the device 10 in accordance with one embodiment of the present invention. In the presently illustrated embodiment, the device 10 includes the display 14 and the I/O ports 18 discussed above. In addition, as discussed in greater detail below, the exemplary device 10 may include a user interface 20, one or more processors 22, a memory device 24, a non-volatile storage 26, an expansion card 28, a networking device 30, and a power source 32.

As discussed further herein, the user interface 20 may be displayed on the display 14, and may provide a means for a user to interact with the electronic device 10. The user interface may be a textual user interface, a graphical user interface (GUI), or any combination thereof, and may include various layers, windows, screens, templates, elements, or other components that may be displayed in all or in part of the display 14. The user interface 20 may, in certain embodiments, allow a user to interface with displayed interface elements via one or more user input structures 16 and/or via a touch sensitive implementation of the display 14. In such embodiments, the user interface provides interactive functionality, allowing a user to select, by touch screen or other input structure, from among options displayed on the display 14. Thus the user can operate the device 10 by appropriate interaction with the user interface 20.

The processor(s) 22 may provide the processing capability required to execute the operating system, programs, user interface 20, and any other functions of the device 10. The processor(s) 22 may include one or more microprocessors, such as one or more "general-purpose" microprocessors, one or more special-purpose microprocessors and/or ASICS, or some combination thereof. For example, the processor 22 may include one or more reduced instruction set (RISC) processors, such as a RISC processor manufactured by Samsung, as well as graphics processors, video processors, and/or related chip sets.

As noted above, embodiments of the electronic device 10 may also include a memory 24. The memory 24 may include a volatile memory, such as random access memory (RAM), and/or a non-volatile memory, such as read-only memory (ROM). The memory 24 may store a variety of information and may be used for various purposes. For example, the memory 24 may store the firmware for the device 10, such as an operating system, other programs that enable various functions of the device 10, user interface functions, processor functions, and may be used for buffering or caching during operation of the device 10.

The non-volatile storage 26 of device 10 of the presently illustrated embodiment may include ROM, flash memory, a hard drive, or any other suitable optical, magnetic, or solid-state storage medium, or a combination thereof. The storage 26 may store data files such as media (e.g., music and video files), software (e.g., for implementing functions on device 10), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable the device 10 to establish a wireless connection, such as a telephone connection), subscription information (e.g., information that maintains a record of podcasts, television shows, or other media to which a user subscribes), telephone information (e.g., telephone numbers), and any other suitable data.

The embodiment illustrated in FIG. 2 also includes one or more expansion cards 28. Card slots may be configured to receive expansion cards 28 that may be used to add functionality to the device 10, such as additional memory, I/O functionality, or networking capability. Such an expansion card 28 may connect to the device through any type of suitable connector, and may be accessed internally or external to the enclosure 12. For example, in one embodiment, the card may be flash memory card, such as a SecureDigital (SD) card, mini- or microSD, CompactFlash card, Multimedia card (MMC), or the like. Additionally, in an embodiment including mobile telephone functionality, a card slot may receive a Subscriber Identity Module (SIM) card.

The exemplary device 10 depicted in FIG. 2 also includes a network device 30, such as a network controller or a network interface card (NIC). In one embodiment, the network device 30 may be a wireless NIC providing wireless connectivity over any 802.11 standard or any other suitable wireless networking standard. The network device 30 may allow the device 10 to communicate over a network, such as a LAN, WAN, MAN, or the Internet. Further, the device 10 may connect to and send or receive data with any device on the network, such as portable electronic devices, personal computers, printers, and so forth. For example, in one embodiment, the device 10 may connect to a personal computer via the network device 30 to send and receive data files, such as media files. Alternatively, in some embodiments, the portable electronic device may not include a network device 30. In such an embodiment, a NIC may be added as an expansion card 28 into a card slot to provide similar networking capability as described above.

Further, the device 10 may also include a power source 32. In one embodiment, the power source 32 may be one or more batteries, such as a Li-Ion battery, may be user-removable or secured to the housing 12, and may or may not be rechargeable. Additionally, the power source 32 may include AC power, such as provided by an electrical outlet, and the device 10 may be connected to the power source 32 via the I/O ports 18.

Figure 3:
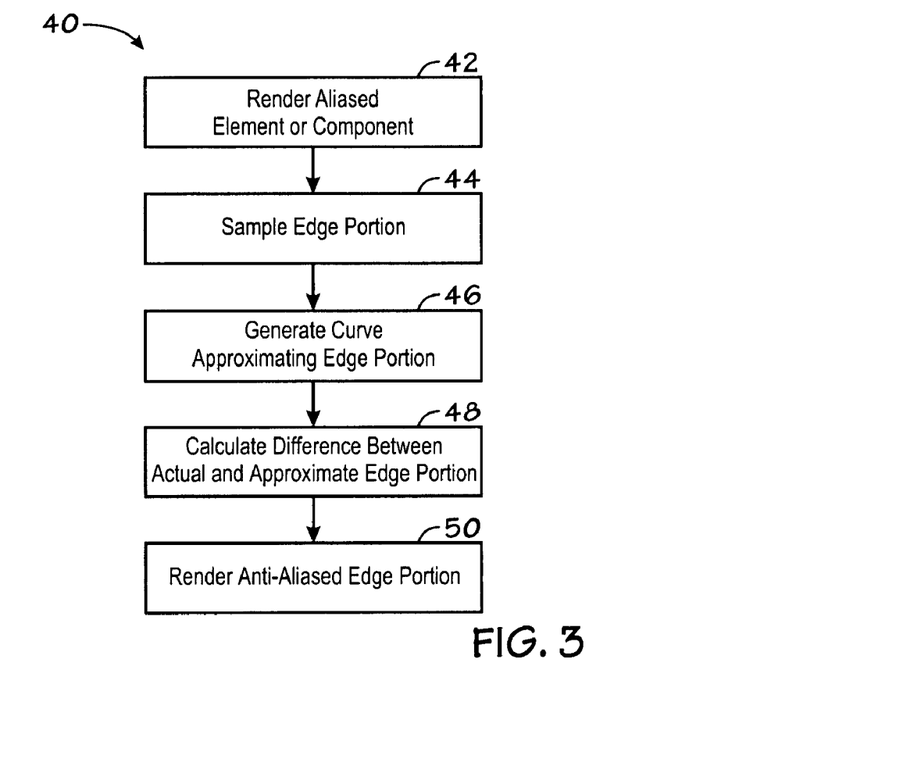
FIG. 3 is a flowchart depicting a process for rendering graphical data in accordance with one embodiment of the present invention.

It should again be noted that various images and data, including graphical data, may be processed and displayed by the device 10. Accordingly, and turning now to FIG. 3, a flow chart of an exemplary method 40 for rendering graphical data is depicted in accordance with one embodiment of the present invention. The exemplary method 40 may generally include the rendering of an aliased version of an element of a graphical object, such as a polygon, a shape, a line, or a curve, and the sampling of an edge portion of that element, which generally correspond to blocks 42 and 44, respectively, of the presently illustrated embodiment. The method 40 may also include the generation of a curve and/or function that approximates the edge portion, and the calculation of the difference between the sampled edge portion and the curve, which generally correspond to blocks 46 and 48, respectively, of the exemplary flow chart of FIG. 3. Further, the exemplary method 40 may also include the rendering of an anti-aliased version of the sampled edge portion of the polygon or other element, generally corresponding to block 50 in FIG. 3.

Various exemplary steps of the method 40, including those noted above, are explained in greater detail below in accordance with one embodiment and may be better understood with reference to FIGS. 4-9. While the present discussion refers to the rendering and anti-aliasing of polygons, it will be appreciated that the presently disclosed techniques may also be applied to other rendered, aliased elements, including lines, curves, and other shapes. Further, while the present description may include reference to either a single or multiple polygons and/or edge portions, it will be appreciated that a plurality of polygons and/or edge portions may be processed in generally the same manner as a single polygon and/or edge portion in full accordance with the present techniques. Additionally, in various embodiments, multiple polygons may be rendered in an anti-aliased fashion through the processes presently disclosed.

Figure 4:
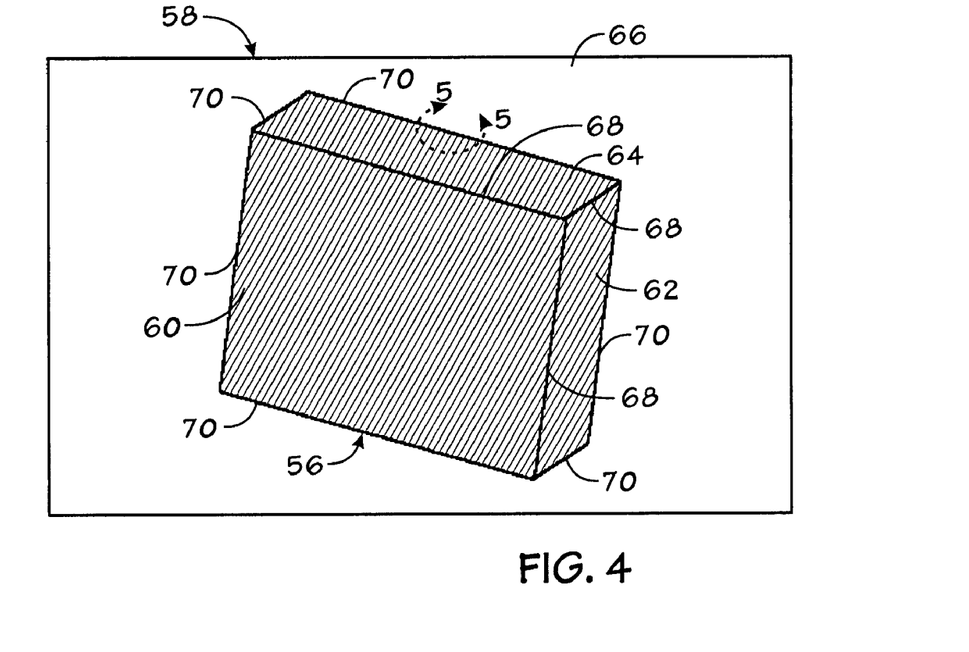
FIG. 4 depicts the rendering of an aliased version of a graphical object in a two-dimensional field in accordance with one embodiment of the present invention.
Figure 5:
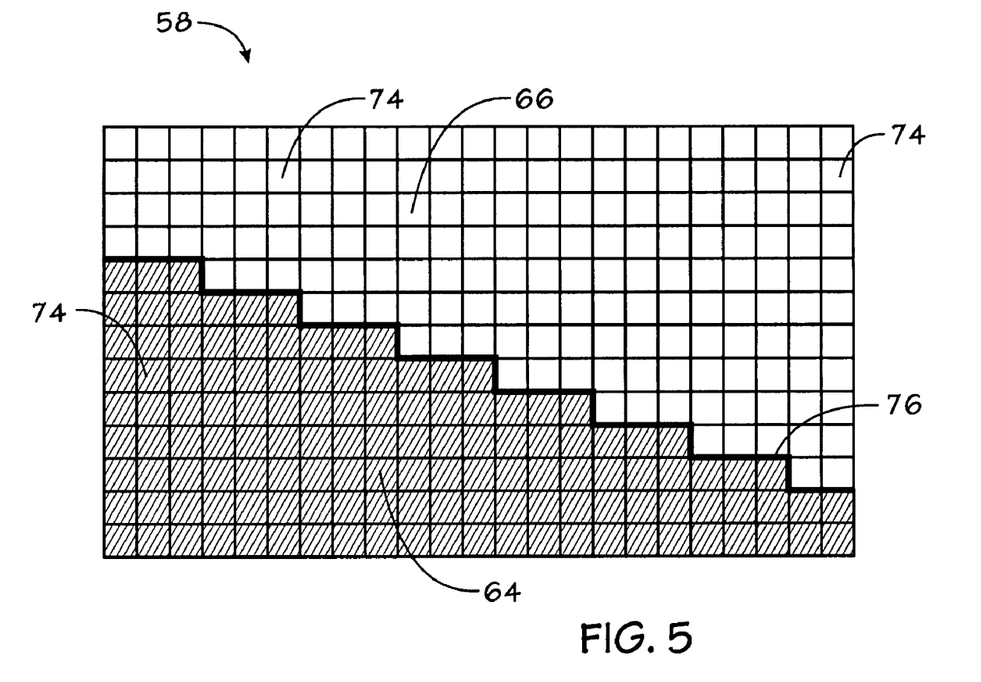
FIG. 5 is a detailed view of an edge portion of the graphical object of FIG. 4, illustrating in greater detail the aliasing of the edge portion in accordance with one embodiment of the present invention.

Generally corresponding to the rendering of an aliased polygon (block 42 of FIG. 3), various polygons of a graphical object 56 may be rendered in an aliased fashion in a two-dimensional field 58 of pixels, as illustrated in FIG. 4, in accordance with one embodiment of the present invention. As used herein, the term "rendering" refers to the drawing of one or more aspects (e.g., lines, curves, polygons, or the like) of the graphical object. In various embodiments, these rendered, aliased polygons of the graphical object may be output, such as to display 14 of the exemplary device 10, or saved in memory (such as a frame buffer) for further processing, which may include anti-aliasing prior to outputting the image.

In the presently illustrated embodiment, the graphical object 56 is a three-dimensional object and, more particularly, is a rectangular prism that includes polygons 60, 62, and 64. Although the exemplary graphical object 56 is a rectangular prism of a particular size, it should be noted that graphical objects 56 of other embodiments may include a wide range of various sizes and shapes, including shapes that are not three-dimensional, such as two-dimensional shapes. In various embodiments, the rendered, aliased graphical object may be output, such as to display 14 of the exemplary device 10, or saved in memory for further processing.

It may be appreciated that the polygons 60, 62, and 64 of the graphical object 56 may be considered to be rendered over a background polygon 66. The polygons 60, 62, 64, and 66 may be rendered in various colors (which may include black, white, and combinations thereof, in addition to other colors that may be reproduced on a display) and/or shades depending on the desired appearance. In the present illustration of FIG. 4, the polygons 60, 62, and 64 are shaded to indicate that these polygons may be rendered in a color different than that of the background polygon 66. Additionally, each rendered polygon may have a different color; indeed, any or all of the polygons 60, 62, 64, and 66 may include a plurality of color values for different pixels of the respective polygon. In other words, in various embodiments, any or each of these polygons 60, 62, 64, and 66 may be filled with a plurality of colors or shades. For instance, the polygons may be filled with a bitmap of an image, a photograph, or the like.

Based on the relative position of the polygons 60, 62, 64, and 66, various edge features are formed between these polygons. For instance, in the presently illustrated embodiment, edges 68 correspond to the borders between the polygon 60, 62, and 64 of the graphical object 56, while edges 70 separate the graphical object polygons from the background polygon 66. Due to the finite resolution of the two-dimensional field 58, the size of the pixels within the field 58, and the angle at which the edges are rendered with respect to the vertical and horizontal arrangement of the pixels, the diagonal edges 68 and 70 of the aliased version of the graphical object 56 exhibit certain image artifacts. This effect is illustrated in greater detail in FIG. 5, which depicts a small portion (generally represented by detail line 5-5 in FIG. 4) of the two-dimensional field 58 containing a portion of the edge 70.

As generally noted above, the two-dimensional field 58 includes a plurality of pixels 74 in which the polygons 60, 62, 64, and 66 are rendered. For the sake of clarity, it should be noted that individual pixels 74 are generally defined by the gridlines illustrated in FIGS. 5-8. In the presently illustrated embodiment, an edge portion 76 of the edge 70 generally divides the polygon 64 from the background polygon 66. In some embodiments, the pixels of polygons 64 and 66 on opposite sides of the edge portion 76 include colors that are different from one another. For example, in the presently illustrated embodiment, the pixels 74 immediately below the edge portion 76 may be rendered in a color of the polygon 64 (such as black or some other color), while the pixels 74 immediately above the edge portion 76 may be rendered in a color of the background polygon 66 (such as white or some other color). Consequently, the aliased edge portion 76 may exhibit significant image artifacts, generally referred to in the art as "stair-stepping" or "jaggies".

Figure 6:
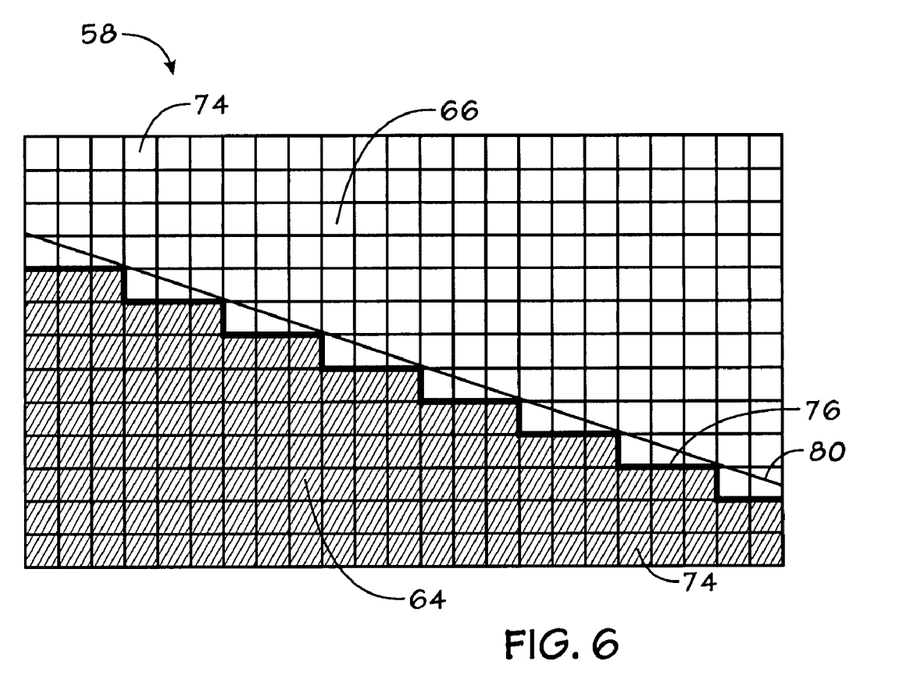
FIG. 6 generally illustrates the calculation of a curve that approximates the aliased edge portion of FIG. 5 in accordance with one embodiment of the present invention.

To facilitate anti-aliasing of the edge portion 76, the exemplary method 40 includes sampling or otherwise determining the spatial location and contours of the edge portion 76 within the two-dimensional field 58, and generating a function or curve 80 that approximates the edge portion 76, as generally illustrated in FIG. 6. In various embodiments, this sampling and function generation may be performed after rendering of the aliased version of portions of the graphical object, and may be performed before or after the output of a rendered image to a display. Noting that the "stair-stepping" of the aliased edge portion 76 is generally the result of the finite size of the pixels 74, in some embodiments the curve 80 may represent the idealized version of the edge portion 76 (i.e., that which may be otherwise desirable if the pixels 74 were of infinitesimal size). It should also be noted that the curve 80 passes through a subset of pixels in the field 58. While the curve 80 of the presently illustrated embodiment is a linear curve, it will be appreciated that other edge approximations may be represented by non-linear curves or functions, such as quadratic functions, cubic functions, quartic functions, or the like, trigonometric functions, exponential functions, any other mathematical function, or some combination of such functions.

Figure 7:
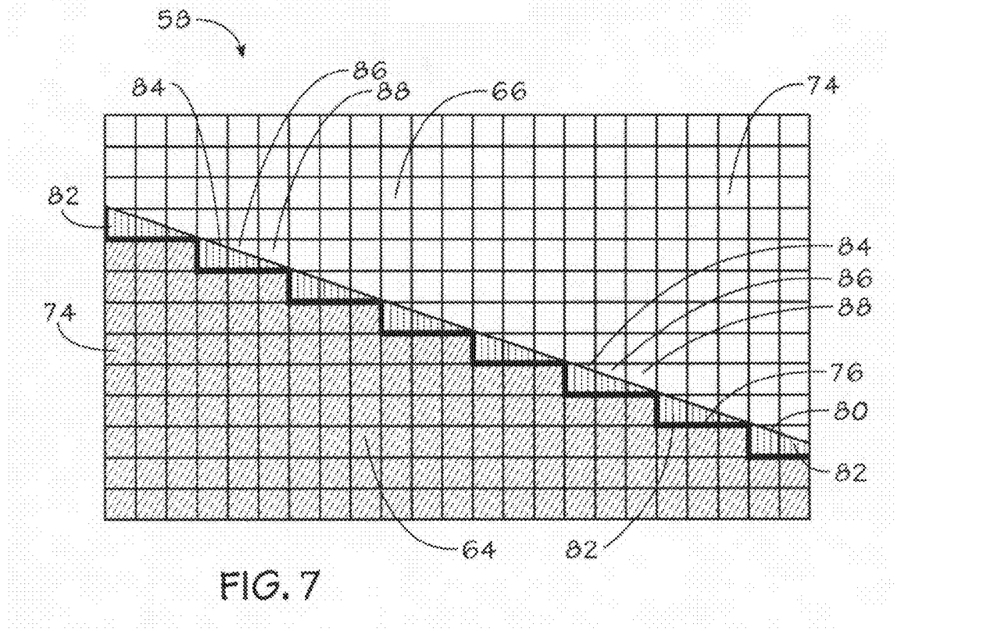
FIG. 7 illustrates the measurement of the area between the curve and the aliased edge portion for pixels along the curve in accordance with one embodiment of the present invention.

As noted above, the exemplary method 40 further includes calculating the difference between the actual aliased edge portion 76 and the approximate edge portion represented by the curve 80, as generally illustrated in FIG. 7. Such calculation may include determining, for some or all of the pixels 74 intersected by the curve 80, the proportional area 82 of the pixel that is located between the curve 80 and the aliased edge portion 76. For instance, for each "step" of the aliased edge portion 76, the curve 80 intersects pixels 84, 86, and 88. The proportional area of each pixel falling between the aliased edge portion 76 and the curve 80 may be determined in any suitable manner and, in some embodiments, may include or consist of estimating the proportional area. For instance, taking one set of pixels 84, 86, and 88, and considering these pixels as having one-unit lengths within a Cartesian coordinate system with the lower left corner of the pixel 84 as the origin, the portion of the curve 80 crossing these pixels may be generally represented by the function:

$$f(x)=-(x/3)+1$$

and the proportional area of each pixel may be determined by integrating this function over the domain of each pixel (i.e., 0 to 1, 1 to 2, and 2 to 3). As a result, in the presently illustrated embodiment, the portions of the pixels 84, 86, and 88 located between the aliased edge portion 76 and the curve 80 are (to three significant digits) 83.3%, 50.0%, and 16.7%, respectively. In other embodiments, the proportional area of each pixel falling between the aliased edge portion 76 and the curve 80 may be determined through other techniques, such as calculating the distance of the curve from a given point (such as the mid-point) of opposite edges of the pixel and estimating the proportional area based on this distance, through use of a Riemann sum technique to estimate the proportional area, or through any other suitable technique.

Figure 8:
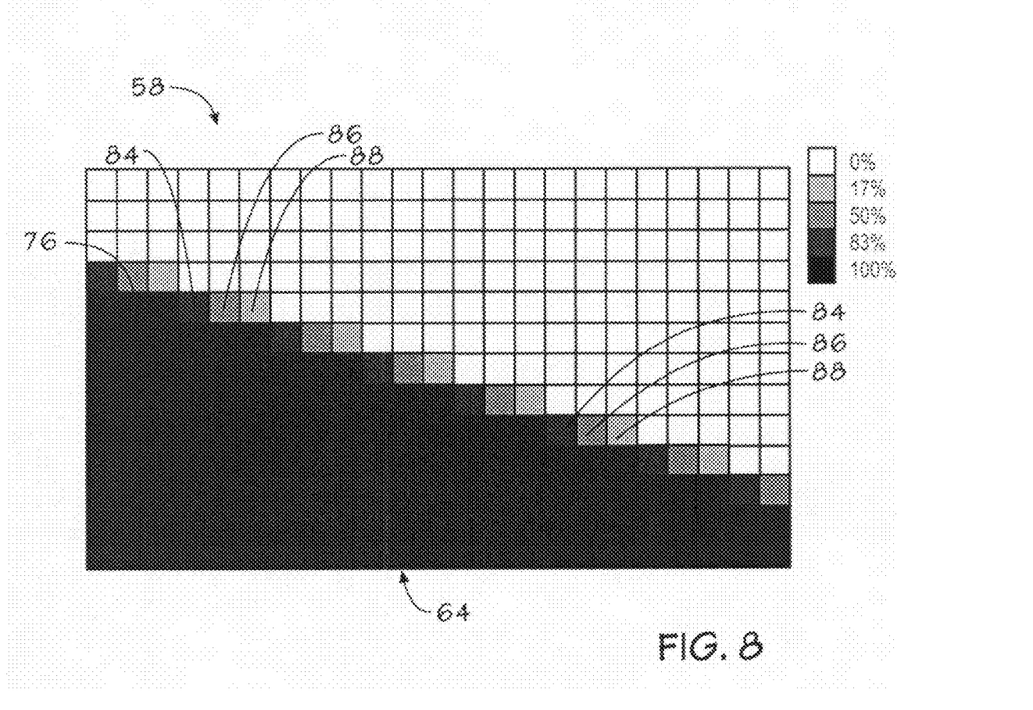
FIG. 8 depicts the rendering of an anti-aliased version of the edge portion in accordance with one embodiment of the present invention.

Following the calculation of these areas, an anti-aliased version of the edge portion 76 may be rendered, as illustrated in FIG. 8 in accordance with one embodiment of the present invention. As noted above, the polygon 64 and 66 may comprise any of numerous different colors, and may each include multiple colors. For the sake of clarity, in FIG. 8 the pixels of polygons 64 and 66 are generally illustrated in black and white, respectively, but it will be appreciated by one skilled in the art that the present techniques may be applied in numerous other embodiments including a vast array of other colors in addition to black and white. In the presently illustrated embodiment, rendering an anti-aliased version of the edge portion 76 includes the blending of two different colors (black and white in the presently illustrated embodiment) from pixels of the polygons 64 and 66 adjacent to a pixel intersected by the curve 80 and on opposite sides of the intersected pixel and the curve 80, and then rendering the intersected pixel in the blended color derived from its adjacent pixels.

Particularly, in the presently illustrated embodiment, the black and white colors of respective pixels of polygons 64 and 66 adjacent to the pixels 84, 86, and 88 are blended for each of the pixels 84, 86, and 88 in general proportion to the portion of those pixels located between the aliased edge portion 76 and the curve 80, as generally described above. The pixels 84, 86, and 88 may then be rendered in the new, blended colors. For instance, as noted above, roughly 83.3% of the area of each pixel 84 is located between the curve 80 and the aliased edge portion 76, while the similar areas of the pixels 86 and 88 are 50.0% and roughly 16.7%, respectively, of their total areas. Accordingly, the pixels 84 may be assigned a new color that is approximately an 83% black-17% white blend, the pixels 86 may be assigned a new color that is approximately a 50% black-50% white blend, and the pixels 88 may be assigned a new color that is approximately a 17% black-83% white blend. The pixels 84, 86, and 88 may then be rendered in their new colors, such as illustrated in FIG. 8.

Figure 9:
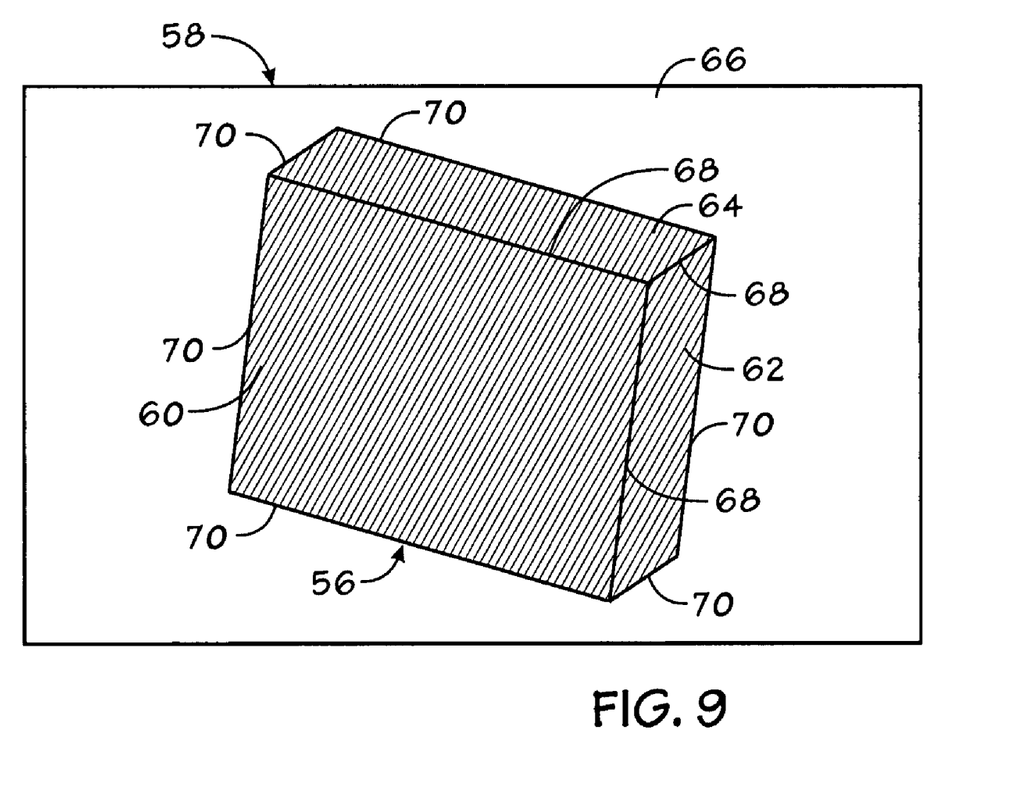
FIG. 9 depicts the rendering of an anti-aliased version of the graphical object in a two-dimensional field in accordance with one embodiment of the present invention.

Moreover, the above techniques may be applied to each of the edges 68 and 70 of the graphical object 56 to produce an anti-aliased version of the graphical object 56, as generally illustrated in FIG. 9. It will be appreciated that the anti-aliased version of the graphical object 56 illustrated in FIG. 9 may soften, or slightly blur, various edges and/or lines of the object 56, giving the lines a "smooth" or "fuzzy" appearance that is more realistic in comparison to the aliased version. Further, it should be noted that the rendered, anti-aliased version of the graphical object 56 may be output to a display, such as the display 14 of the exemplary device 10, for viewing by a user. Still further, in some embodiments, such as those in which the graphical object has greater than two dimensions, the rendering of an aliased version in the two-dimensional field 58 of pixels may significantly reduce the resources and computational power needed to sample the edges of the graphical object, calculate an approximate edge, and render an anti-aliased version of the graphical object, due to the removal of one or more dimensions from the calculations.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for rendering graphical data, the method comprising using one or more processors of an apparatus to execute:
rendering, in two dimensions, an aliased version of an element of a three-dimensional graphical object in a two-dimensional field comprising a plurality of pixels;
sampling, in a single sampling operation, an edge portion of the two-dimensional aliased version of the element in the two-dimensional field;
calculating a curve, using the one or more processors, based on the sampled edge portion that approximates but does not overlap the sampled edge portion and intersects a first subset of pixels;
determining the respective proportional areas of each pixel of the first subset of pixels that is located between the curve and the sampled edge portion of the aliased version of the element; and
rendering an anti-aliased version of the sampled edge portion based at least in part on the magnitudes of the respective proportional areas.

2. The method of claim 1, wherein the element of the three-dimensional graphical object is a polygon.

3. The method of claim 2, wherein the sampled edge portion divides a second subset of pixels within the aliased version of the polygon from a third subset of pixels external to the aliased version of the polygon, and wherein the second and third subsets of pixels respectively comprise first and second colors different from one another.

4. The method of claim 3, wherein rendering the anti-aliased version of the sampled edge portion comprises rendering at least one pixel of the first subset of pixels in a color blend of the first and second colors, and wherein the proportions of the first and second colors in the color blend for the at least one pixel of the first subset of pixels is based on the respective proportional area of the at least one pixel that is located between the curve and the sampled edge portion of the aliased version of the polygon.

5. The method of claim 1, wherein calculating the curve comprises calculating a linear curve that approximates the sampled edge portion of the aliased version of the element.

6. The method of claim 1, wherein rendering the aliased version of the element comprises displaying the aliased version of the element on a display of a device.

7. The method of claim 1, wherein rendering the anti-aliased version of the sampled edge portion comprises displaying the anti-aliased version of the sampled edge portion on a display of a device.

8. A device comprising:
a housing;
a display disposed in the housing;
a memory device disposed in the housing, the memory device including executable application instructions stored therein; and
a processor disposed in the housing and configured to execute the application instructions stored in the memory device;
wherein the device is configured to render in two dimensions an aliased version of an element of a three-dimensional graphical object in a two-dimensional field comprising a plurality of pixels, to sample, in a single sampling operation, one or more edges of the two-dimensional aliased version of the element in the two-dimensional field, to calculate one or more curves based on the sampled edge portion approximating but not overlapping the one or more sampled edges of the aliased version of the element, and to render an anti-aliased version of the element based on the sampling of the one or more edges and on the calculating of the one or more curves approximating the one or more sampled edges.

9. The device of claim 8, wherein the device is configured to render the anti-aliased version of the element on the display.

10. The device of claim 8, wherein the anti-aliased version of the element comprises a plurality of anti-aliased edges.

11. The device of claim 10, wherein each edge of the anti-aliased version of the element is anti-aliased.

12. The device of claim 8, wherein the device comprises a portable media player.

13. A method for rendering graphical data, the method comprising using one or more processors of an apparatus to execute:
rendering in two dimensions aliased versions of a pair of three-dimensional graphical elements in a two-dimensional field of pixels such that the pair of three-dimensional graphical elements include a common, aliased edge;
sampling, in a single sampling operation, the common, two-dimensional aliased edge of the pair of three-dimensional graphical elements in the two-dimensional field of pixels;

computing a curve, using the one or more processors, based on the sampled, aliased edge that approximates but does not overlap the sampled, aliased edge between the pair of three-dimensional graphical elements; and rendering anti-aliased versions of the pair of three-dimensional graphical elements based at least in part on adjusting a subset of pixels intersected by the curve.

14. The method of claim 13, comprising displaying the anti-aliased versions of the pair of three-dimensional graphical elements.

15. The method of claim 13, wherein adjusting a subset of pixels comprises rendering each pixel of the subset of pixels in a color different from those of any adjoining pixel that is not intersected by the curve.

16. The method of claim 15, wherein the rendered color of each pixel of the subset of pixels is a blend of colors from each of the pair of three-dimensional graphical elements.

17. The method of claim 16, wherein the rendered color of at least one pixel of the subset of pixels is a blend of two different colors of two pixels adjacent to the at least one pixel and not intersected by the curve.

18. The method of claim 13, wherein the pair of three-dimensional graphical elements comprise two polygons.

19. One or more non-transitory, tangible, machine-readable media having application instructions encoded thereon, the application instructions comprising:

instructions for rendering in two dimensions an aliased version of a plurality of polygons of one or more three-dimensional graphical objects in a two-dimensional field comprising a plurality of pixels, the aliased version comprising a plurality of jagged edges;

instructions for sampling, in a single sampling operation, a jagged edge portion of at least one polygon of the two-dimensional aliased version of the plurality of polygons in the two-dimensional field;

instructions for calculating a curve based on the sampled, jagged edge portion that approximates but does not overlap the sampled, jagged edge portion and intersects a subset of pixels;

instructions for determining the respective proportional areas of each pixel of the subset of pixels that is located between the curve and the sampled, jagged edge portion; and instructions for rendering a smoothed version of the sampled, jagged edge portion based at least in part on the magnitudes of the respective proportional areas.

20. The one or more non-transitory, tangible, machine-readable media of claim 19, wherein the application instructions comprise instructions for outputting the aliased version of the plurality of polygons and/or instructions for outputting the smoothed version of the sampled, jagged edge portion to a display.

21. The one or more non-transitory, tangible, machine-readable media of claim 19, wherein the one or more non-transitory, tangible, machine-readable media comprises a flash memory device.

22. The one or more non-transitory, tangible, machine-readable media of claim 19, wherein the one or more non-transitory, tangible, machine-readable media comprises a hard disk drive.

* * * * *